United States Patent Office 3,027,937
Patented Apr. 3, 1962

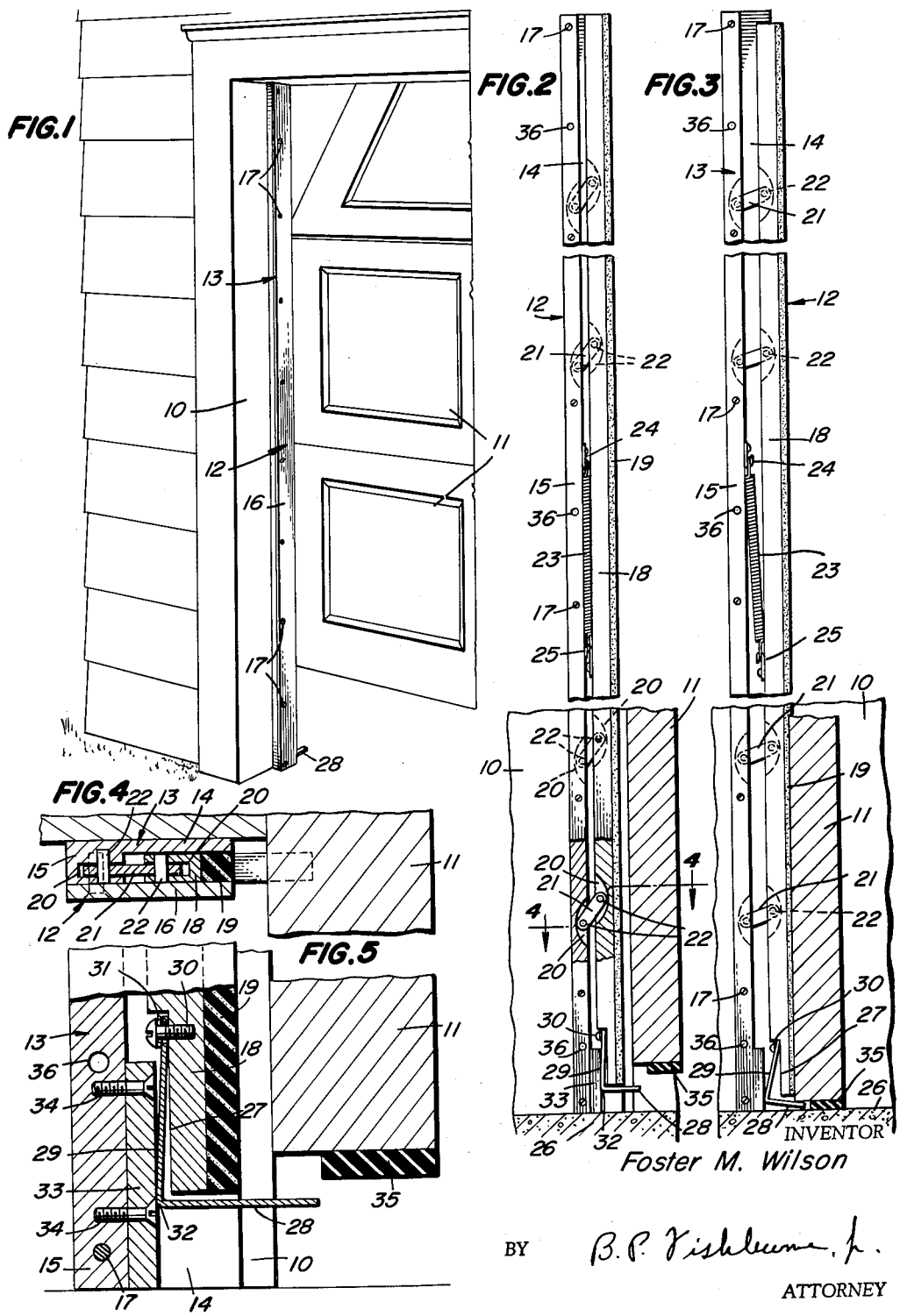

3,027,937
WEATHER STRIP FOR SLIDING CLOSURES
Foster M. Wilson, R.D. 4, Dupont Parkway N., Dover, Del.
Filed Nov. 18, 1960, Ser. No. 70,289
2 Claims. (Cl. 160—40)

This invention relates to a weather strip or seal for sliding closures.

An important object of the invention is to provide a novel and simplified movable weather strip or seal for sliding closures, such as overhead garage doors and the like.

A further object of the invention is to provide a weather strip for sliding closures which is much simpler in construction and easier and more reliable in operation than certain prior art devices for the same general purposes.

A further and more specific object is to provide a movable weather strip or seal of the above-mentioned character having an extremely simple, easy operating linkage and actuator, embodying few parts, and economical to manufacture and install.

A further object of the invention is to provide a device of the above-mentioned character including components adapted to be formed of extruded aluminum or the like.

Still another object of the invention is to provide a movable weather strip for sealing a variety of types of sliding doors or closures and including operating components which have a minimum of friction and which are fully shielded from the elements.

Other objects and advantages of the invention will become apparent during the course of the following detailed description.

In the accompanying drawings, forming a part of this application, and in which like numerals are employed to designate like parts throughout the same, FIGURE 1 is a fragmentary perspective view of a weather strip or seal according to the invention installed upon the frame of an overhead type sliding garage door, or the like, FIGURE 2 is a fragmentary vertical section through the weather strip and associated elements shown in FIGURE 1, partly broken away and parts in elevation, FIGURE 3 is a sectional view, similar to FIGURE 2, and showing the weather strip, in the active position for sealing the closed garage door, FIGURE 4 is an enlarged fragmentary horizontal cross section taken on line 4—4 of FIGURE 2, FIGURE 5 is an enlarged fragmentary vertical section similar to FIGURE 2 and showing particularly the weather strip actuator element and its relationship to the lower end of the closure just prior to actuation of the weather strip.

In the drawings, wherein for the purpose of illustration is shown a preferred embodiment of the invention, the numeral 10 designates one vertical side of a door frame for an articulated sliding overhead garage door, embodying a plurality of hinged sections 11, as shown. The construction and operation of this type of door is conventional and well known, and a detailed description of the door herein is believed to be unnecessary.

The weather strip proper according to the invention is shown generally at 12 in FIGURE 1 and comprises an elongated body portion 13 of the desired length to fit the particular frame side 10 and adapted to be formed as a unitary aluminum extrusion, or the like, if preferred. The body portion 13 comprises a relatively narrow flat plate portion 14 and an enlarged frontal edge portion 15 integral therewith, rendering the body portion 13 generally L-shaped in cross section as shown in FIGURE 4. A companion section or cover plate 16 for the body portion 13 is provided, and preferably formed separately therefrom for ease of assemblying the weather strip device.

The cover plate 16 is flat and of uniform thickness throughout its entire length and is coextensive with the body portion 13 in assembly, and detachably secured thereto by a plurality of longitudinally spaced screws 17, or the like, having screw-threaded engagement within openings in the enlarged edge portion 15.

As shown in FIGURE 4, the body portion 13 and cover plate 16 together in assembly constitute a channel-like housing for the movable components of the weather strip now to be described. This channel-like housing is open at its rear edge adjacent the door sections 11 and closed at its forward edge remote from the door and facing outwardly on the door frame 10.

Mounted movably between the plate portion 14 and cover plate 16 of the housing is an elongated one piece straight weather strip bar 18, likewise formed of aluminum or the like and substantially coextensive with the body portion 13 and cover plate 16, although slightly shorter than these elements. The exposed longitudinal edge or face of the weather strip bar 18 has a continuous sealing strip 19 adhesively bonded to it throughout its entire length, and the strip 19 may be formed of highly compressible soft yet resilient foamed plastics material, sponge rubber or the like.

The opposed faces of the enlarged portion 15 and the weather strip bar 18 are slotted as at 20 at a plurality of longitudinally equidistantly spaced points along these elements, and short connector links 21 have their opposite end portions disposed within the slots 20, as shown in FIGURE 2, and pivoted to the elements 15 and 18 by means of suitable pins 22, provided for this purpose and secured rigidly within openings of the enlarged portion 15 and weather strip bar 18. The several links 21 and pins 22 thus serve to pivotally and slidably interconnect the weather strip bar 18 with the housing composed of the body portion 13 and cover plate 16, as should be obvious. The weather strip may be constructed in substantially any desired length to accommodate various closures, and accordingly, the number of links 21 and associated elements employed and their spacing may be varied as found desirable.

A single retractile coil spring 23 of slender construction is disposed lengthwise between the back of the weather strip bar 18 and the enlarged portion 15, as shown in FIGURES 2 and 3. This spring is preferably located at or near the longitudinal center of the elongated weather strip unit and midway between one adjacent pair of the links 21. One end of the spring 23 is detachably secured at 24 to the enlarged portion 15, and the other end of the spring is detachably secured at 25 to the back of the weather strip bar 18. The retractile spring 23 serves to normally hold the weather strip bar 18 in a retracted position where the compressible strip 19 is spaced from the door panel or section 11, FIGURE 2. In such retracted position, the spring 23 is parallel to the elements 15 and 18 and in contact therewith and serving as a stop to limit the movement of the bar 18 upwardly and toward the enlarged portion 15. At this time, FIGURE 2, the upper end of the bar 18 is flush with the top of body portion 13 and the lower end of the bar 18 is elevated somewhat above the lower end of the body portion 13 and above the floor 26. When the bar 18 is so positioned, the working face of the compressible strip 19 is flush or substantially flush with the open side of the channel-like housing afforded by the body portion 13 and cover plate 16, FIGURE 4.

The lower end and back face of the weather strip bar 18 are recessed at 27 to accommodate a substantially L-shaped actuator having a horizontal portion 28 projecting forwardly of the strip 19 and a generally vertical portion 29, integral therewith and extending thereabove within the recess 27. The upper end of the vertical portion 29 of the actuator is suspended loosely and pivotally from a screw 30 or the like, anchored within a screw-threaded opening in the weather strip bar 18. A spring washer 31 is preferably interposed between the head of the screw 30 and the vertical part of the actuator as shown in FIGURE 5. When the actuator portion 28 is level or horizontal and the weather strip bar 18 is in the retracted position, FIGURE 2, the portion 29 of the actuator is at a slight angle to the vertical as best shown in FIGURE 5. A heel portion 32 of the weather strip actuator slidably abuts a bearing plate 33, secured rigidly at 34 to the lower end portion of the body portion 13, and opposite to the recess 27, as shown.

When the closure, such as the overhead garage door illustrated in the drawings, is shifted downwardly toward the closed position, the lowermost panel section 11 will be spaced from the strip 19 as shown in FIGURE 2 until the door is almost closed. The front faces of the door panels may have guided engagement with the inner side of the frame 10 or may be suitably guided vertically in any conventional manner. At this time, the spring 23 is active to hold the weather strip bar 18 and the weather strip 19 retracted as shown in FIGURE 2.

Just prior to reaching the floor 26, the lower edge of the lowermost door panel 11 engages the horizontal portion 28 of the weather strip actuator, such portion 28 being always in the path of travel of the door and projecting beyond the weather strip 19, as stated. When the lower edge of the door engages the L-shaped actuator, the same partakes of a compound pivotal and sliding movement as shown in FIGURE 3, and the heel portion 32 slides downwardly upon the bearing plate 33 while the L-shaped actuator assumes an inclined position as shown at the bottom of FIGURE 3. When this occurs, the weather strip bar 18 is pulled downwardly against the tension of the spring 23 and the links 21 turn upon their pivots to shift the bar 18 bodily toward the front face of the door, and the compressible strip 19 engages the door and seals the same tightly as indicated in FIGURE 3. When the door is fully lowered or closed, FIGURE 3, the weather strip 19 will be projected a sufficient distance from the channel-like housing to enable the strip 19 to effectively seal the door, and at this time, the strip 19 is projected bodily outside of its housing along with a portion of the bar 18 carrying the strip. The lower edge of the lowermost door panel 11 may be provided with a compressible weather strip or gasket 35, as shown.

Upon upward movement or opening of the door, as soon as the lowermost panel 11 rises a very slight distance to the approximate position shown in FIGURE 2, its lower edge disengages the L-shaped actuator 28—29, and the retractile spring 23 immediately returns the weather strip bar 18 to the retracted or housed position, wherein the compressible strip 19 is shifted clear of the sliding door. By virtue of this arrangement, friction between the sliding door or door panels and the compressible weather strip is avoided substantially entirely, with the result that wear upon the weather strip is substantially entirely eliminated. The weather strip remains clear of the door until the latter is almost fully closed, and then shifts almost instantly into effective sealing engagement wtih the door. When the door is opened, the seal is broken almost instantly and the door rises free of frictional engagement with the weather strip as should now be obvious.

The weather strip bar 18 has a free sliding fit within the space between the cover plate 16 and plate portion 14, and the links 21 and their pivots 22 are substantially free of friction. The L-shaped actuator 28—29 is freely pivotal upon the screw 30 and slides readily over the bearing plate 33. Consequently, the weather strip mechanism is free moving with a minimum of friction and without the possibility of the parts binding or becoming stuck. The spring 23 is strong enough to retract the weather strip bar 18 with no difficulty immediately upon its release by the door when the latter moves upwardly. No cams or wedges are employed in the weather strip construction and the ease of operation of the mechanism and its freedom from binding is one of the chief virtues of the invention. The parts are few in number, simple and inexpensive. The device is highly compact, relatively light weight and easy to install without the necessity for fine adjustment.

The body portion 13 is rigidly secured to the adjacent door frame 10 in any suitable manner by means of screws or the like engaging within spaced openings 36 for this purpose.

While the weather strip unit is shown and described in connection with a particular type of closure, it should be understood that the invention is not limited to this type of closure and is applicable to various types of sliding closures including doors, sliding windows and the like. Neither is it necessary to employ the weather strip in a vertical position as shown in FIGURE 1, as the same may obviously be mounted in a horizontal position or inclined, depending upon the type of closure to be sealed.

If preferred, the entire channel-like housing for the weather strip bar 18 and associated elements, including the body portion 13 and the cover plate 16, may be formed as a unit by extruding or the like. However, for ease of assembly, it is believed preferable to form the body portion 13 as a separate extrusion and to form the cover plate 16 separately as shown and described.

It should be observed in connection with the operation of the weather strip unit that the weather strip bar 18 is always parallel to the portion 15 of body portion 13 and the weather strip bar is shifted toward and from the portion 15 through the medium of the links 21, spring 23 and actuator 28—29. The links 21, bar 18 and portion 15 thus constitute a parallelogram linkage, as shown.

It is to be understod that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. The combination with an overhead sliding garage door or the like which is movable downwardly in a vertical plane perpendicular to the floor for closing, of a door frame defining an opening to be sealed by said door when the door is closed and including a vertical frame side, an elongated vertical channel housing secured to said vertical frame side near one vertical edge of the door and having an open side facing the door and spaced somewhat therefrom in all adjusted positions of the door, an elongated vertical weather strip bar disposed movably within the channel housing and substantially coextensive therewith and with the frame side, a plurality of vertically spaced short links pivotally interconnecting the weather strip bar and the closed back of said channel housing and being substantially enclosed within the channel housing and swingable in a vertical plane with the weather strip bar relative to the channel housing, a substantially vertical retractile spring resiliently interconnecting the channel housing and weather strip bar and arranged within the channel housing between the closed back of the latter and the weather strip bar and serving to normally hold the weather strip bar elevated and shifted away from said door and toward the closed back of the channel housing, a resilient compressible weather strip secured to the face of the weather strip bar opposite said door and toward the open side of the channel housing and coextensive with the weather strip bar, and a substantially L-shaped actuator for the weather strip bar loosely pivoted to the back thereof near and above the bottom of the weather strip bar and including a vertical portion generally parallel to the weather strip bar and a horizontal portion underlying the bottom of the weather strip bar and projecting beneath the bottom of the door substantially at right angles thereto to be engaged thereby when the door moves vertically downwardly to the fully closed position, said actuator having a heel portion at the junction of its vertical and horizontal portions slidably and pivotally reacting against said channel housing when the actuator is engaged by the bottom of the door to then shift the weather strip bar and weather strip into weather-tight sealing engagement with the door throughout substantially the entire height of the same when the door is fully closed, slight elevating of the door vertically from its fully closed position releasing said actuator and allowing said spring to retract the weather strip bar and weather strip from said door and into the channel housing.

2. The invention defined by claim 1, and wherein the closed back of the channel housing and the back of the weather strip bar have complementary slots formed therein receiving and housing the end portions of said links, and a short vertical bearing plate on the bottom of the channel housing and projecting forwardly of the closed back of the housing and slidably engaging said heel portion of the L-shaped actuator.

References Cited in the file of this patent
UNITED STATES PATENTS

| | | |
|---|---|---|
| 1,699,611 | Dennis | June 22, 1929 |
| 1,892,986 | Johnson | Jan. 3, 1933 |
| 2,829,405 | Huff | Apr. 8, 1958 |